Feb. 28, 1961   N. W. CRONQUIST ET AL   2,973,465
ELECTROLYTIC CAPACITOR
Filed Dec. 1, 1959

INVENTORS,
NORMAN W. CRONQUIST
BY DONALD MOHLER

Harry M. Saragovitz
ATTORNEY.

United States Patent Office 2,973,465
Patented Feb. 28, 1961

2,973,465

ELECTROLYTIC CAPACITOR

Norman W. Cronquist, Hudson Falls, and Donald Mohler, Saratoga Springs, N.Y., assignors to the United States of America as represented by the Secretary of the Army Filed Dec. 1, 1959, Ser. No. 856,631

3 Claims. (Cl. 317—230)

This invention relates to electrolytic capacitors and more particularly to an improved fill electrolyte for high voltage, high temperature tantalum electrolytic capacitors.

A large variety of electrolyte compositions have been used heretofore for electrolytic capacitors, but in general the known compositions have been found satisfactory only for relatively limited temperature ranges. This is especially true of the water-glycol type electrolytes which have been widely used in preference to inorganic electrolytes such as strong mineral acids since the latter tend to be destructive of capacitor parts with which they come in contact. Temperatures in the vicinity of 100° C. have heretofore been considered a practical upper limit for electrolyte systems of water-organic type. In recent years, however, the development of electrical equipment designed for use in increasingly higher ambient temperatures has placed considerable emphasis on the need for electrical components such as capacitors which are capable of reliable operation even under elevated temperature and high voltage conditions.

It is an object of the present invention to provide a capacitor having a high degree of stability and improved life characteristics when operated at high voltage and over a wide range of temperature, and in particular is capable of operation up to 150° C. and above.

These and other objects of the invention are achieved in an electrolytic tantalum capacitor having a fill electrolyte comprising diallylcyanamide and an ionogen such as potassium thiocyanate dissolved therein.

The invention will be better understood from the following description taken in conjunction with the accompanying drawing, in which—

Figure 1:
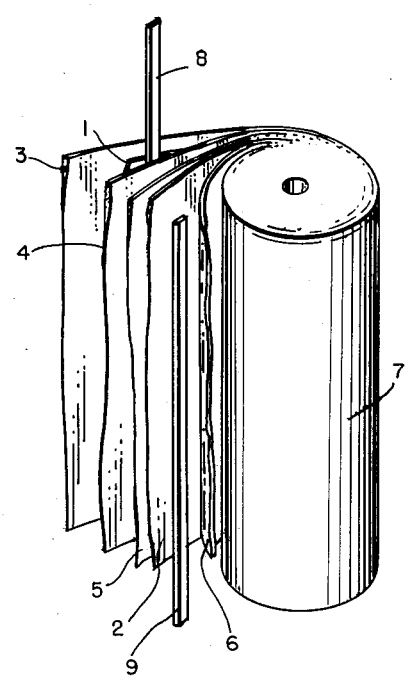
Figure 2:
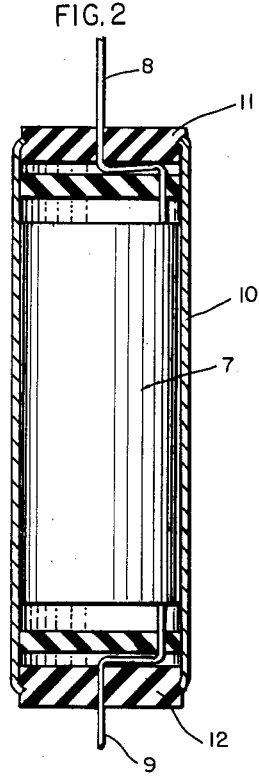

Fig. 1 shows a partially unwound electrolytic tantalum capacitor to which the present invention is applicable, and Fig. 2 shows the body of Fig. 1 inclosed in a casing which is to be filled with the electrolyte according to the present invention.

Referring now to the drawing, there is shown in Fig. 1 a partially unrolled capacitor roll body having electrode foils 1 and 2, at least one of which is made of tantalum or other suitable film-forming metal and being advantageously, although not necessarily, etched and having a dielectric oxide film formed thereon in accordance with known practice. Spacer strips 3, 4, 5 and 6 composed of porous dielectric material such as cellulose paper of a high degree of porosity are arranged separating electrode foils 1 and 2, and the electrodes and spacers are all wound into a compact roll 7 suitable for impregnation with the electrolyte of the present invention. The roll may be impregnated with the electrolyte either before or after insertion into a casing or other container, as is well known in the art. Tap straps 8 and 9 of opposite polarity are respectively fixed in contact with the electrodes 1 and 2 and serve as capacitor terminals.

Fig. 2 shows a capacitor in which the rolled capacitor body 7 is assembled in a casing 10 with terminals 8 and 9 extending respectively through plugs or closures 11 and 12 of suitable insulating material which serve to seal off the opposite ends of casing 10.

The electrolyte described herein when adjusted to suitably low resistivities would also be satisfactory for use in sintered slug type tantalum capacitors.

The electrolyte of the present invention consists principally of diallylcyanamide and a suitable ionogen dissolved therein to provide for the necessary conductivity. Generally, the ionogen will be present in minute amounts, and ordinarily an amount of the ionogen is used which will not precipitate at −55° C. Within such limitation, higher concentrations of ionogen may be used for low voltage applications, whereas lower concentrations of ionogen may be used for higher voltage applications. In general, the range of ionogen content will be from about .01% (or trace amounts) to about 3% by weight of the entire electrolyte composition. A preferred ionogen for the present electrolyte is potassium thiocyanate, this material being readily soluble in the diallylcyanamide and imparting a desirable flexibility in the particular resistivity which it is desired to obtain in the electrolyte solution.

Other salts which are soluble in diallylcyanamide such as ammonium thiocyanate, alkaline borates, alkyl phosphates, oxalates, citrates, tartrates, succinates, nitrates, halides, dichromates and acetates may also be used and show good solubility characteristics in the diallylcyanamide solvents of the present invention.

An electrolyte which has been found particularly satisfactory has the following composition in percent by weight:

| | Percent |
|---|---|
| Diallylcyanamide | 99.96 |
| Potassium thiocyanate | 0.04 |

The electrolyte according to the present invention offers a number of advantages over electrolytes containing dimethyl formamidide which has previously been suggested for high temperature applications.

The physical characteristics of diallylcyanamide represent a considerable improvement over those of dimethyl formamide as illustrated by the comparison below:

|  | Diallylcyanamide | Dimethylformamide |
|---|---|---|
| Freezing point ° C | Less than −70 | −61 |
| Boiling point ° C | 220 | 153 |
| Flash point ° C | 96 | 67 |
| Viscosity, 25° C | 1.092 | 0.802 |
| Vapor press., 85 C mm | 5.8 | 88 |

The present diallylcyanamide electrolyte is exceptionally stable and resistant under servere conditions of heat, light and chemical change, it has considerably lower freezing point and higher boiling point than conventional fill electrolytes, is not corrosive to the metals usually employed as capacitor casings, and has no solvent action on the formed oxide films of the capacitor electrodes. The diallylcyanamide electrolyte further has very little change in viscosity with widely varying temperatures, and this characteristic provides minimum resistivity change with temperature, as well as minimum capacitance change with temperature.

Being non-aqueous, the present electrolyte has lower vapor pressure than aqueous types of electrolytes and thereby presents a lesser problem in maintaining a tight seal around the capacitor. Moreover, the electrolyte avoids the difficulties encountered in the use of known electrolytes containing mixed solvents, wherein one of the solvents more readily vaporizes and thus changes the chemical composition, viscosity, resistivity and freezing point of the electrolyte, and leads to wide changes in capacitance. With the present electrolyte, containing practically 100% diallylcyanamide, as much as 50% of the electrolyte could be lost without appreciably changing the electrical properties or operability of the capacitor.

It will be understood by those skilled in the art that numerous variations and modifications may be made within the spirit of the invention as defined in the appended claims.

What is claimed is:

1. An electrolytic capacitor comprising a pair of electrodes at least one of which is composed of a film-forming metal, and an electrolyte consisting essentially in percent by weight of about 99.99%–97% diallylcyanamide and .01–3% of potassium thiocyanate.

2. An electrolytic capacitor comprising a plurality of electrodes at least one of which is composed of a film-forming metal, dielectric spacer means between said electrodes, and an electrolyte impregnating said dielectric spacer means, said electrolyte being composed of a solution of .01–3% by weight of potassium thiocyanate in a solvent composed of diallylcyanamide.

3. A liquid electrolyte for electrolytic capacitors consisting of a solution of .01–3% by weight of potassium thiocyanate in a solvent composed of diallylcyanamide.

References Cited in the file of this patent

UNITED STATES PATENTS

| | | |
|---|---|---|
| 1,659,793 | Vliet | Feb. 21, 1928 |
| 2,600,180 | Ardis | June 10, 1952 |
| 2,700,652 | Menaul | Jan. 25, 1955 |
| 2,851,642 | Schaeren | Sept. 9, 1958 |